(12) United States Patent
Wirtanen et al.

(10) Patent No.: US 10,904,938 B2
(45) Date of Patent: Jan. 26, 2021

(54) CIRCUIT-SWITCHED DOMAIN RESPONSE TO PACKET-SWITCHED DOMAIN FAILURE

(71) Applicant: FORD GLOBAL TECHNOLOGIES, LLC, Dearborn, MI (US)

(72) Inventors: Jeffrey William Wirtanen, Kanata (CA); Shu-Lin Chen, Kanata (CA); Jason Zhang, Nepean (CA)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 16/351,176

(22) Filed: Mar. 12, 2019

(65) Prior Publication Data

US 2020/0296788 A1 Sep. 17, 2020

(51) Int. Cl.
| | |
|---|---|
| *H04W 76/18* | (2018.01) |
| *H04M 7/00* | (2006.01) |
| *H04W 52/02* | (2009.01) |
| *H04W 4/14* | (2009.01) |
| *H04W 4/44* | (2018.01) |
| *H04W 36/00* | (2009.01) |

(52) U.S. Cl.
CPC ......... *H04W 76/18* (2018.02); *H04M 7/0084* (2013.01); *H04W 4/14* (2013.01); *H04W 4/44* (2018.02); *H04W 36/0022* (2013.01); *H04W 52/0229* (2013.01)

(58) Field of Classification Search
CPC .................................................... H04W 76/18
See application file for complete search history.

(56) References Cited

U.S. PATENT DOCUMENTS

| | | | | |
|---|---|---|---|---|
| 8,135,413 | B2* | 3/2012 | Dupray | H04W 4/029 455/456.1 |
| 8,699,323 | B2 | 4/2014 | Zhao et al. | |
| 8,781,442 | B1* | 7/2014 | Link, II | H04W 12/06 455/411 |
| 9,380,630 | B2 | 6/2016 | Youtz et al. | |
| 9,386,484 | B2* | 7/2016 | Jeong | H04W 48/18 |
| 9,716,762 | B2 | 7/2017 | Petersen et al. | |
| 9,918,264 | B1* | 3/2018 | Bitra | H04W 4/02 |
| 10,249,109 | B1* | 4/2019 | Konrardy | B60R 25/252 |
| 10,412,633 | B1 | 9/2019 | Kotecha et al. | |

(Continued)

*Primary Examiner* — Andrew Lai
*Assistant Examiner* — Andrew C Lee
(74) *Attorney, Agent, or Firm* — Michael J. Spenner; Brooks Kushman P.C.

(57) ABSTRACT

A telematics controller is programmed identify a location of the vehicle responsive to failure of a vehicle-originated data call to initiate packet-switched communications, and send, to a service delivery network configured to provide data services to the vehicle, a message specifying that circuit-switched communication but not packet-switched communication is available to the vehicle. A message is received, over a wide-area network from a vehicle, in response to a failed initiation of a packed-switched data connection over the wide-area network, indicating that packet-switched communications are unavailable at a current location of the vehicle. Failure zones are updated to indicate that the current location of the vehicle is a network location supporting circuit-switched communication but not packet-switched communication over the wide-area network.

21 Claims, 4 Drawing Sheets

(56) References Cited

U.S. PATENT DOCUMENTS

| | | |
|---|---|---|
| 2006/0183472 A1 | 8/2006 | Nookala et al. |
| 2006/0209798 A1* | 9/2006 | Oikarinen ............... H04L 41/06 370/352 |
| 2006/0268916 A1 | 11/2006 | Sarkar |
| 2008/0205413 A1* | 8/2008 | Purnadi ............. H04W 36/0022 370/401 |
| 2009/0135731 A1 | 5/2009 | Secades et al. |
| 2010/0202368 A1* | 8/2010 | Hans ..................... H04W 24/04 370/329 |
| 2010/0272025 A1* | 10/2010 | Yu ..................... H04W 36/0022 370/328 |
| 2011/0110302 A1* | 5/2011 | Faurie .................. H04W 68/02 370/328 |
| 2011/0242975 A1 | 10/2011 | Zhao et al. |
| 2013/0133041 A1 | 5/2013 | Magyar et al. |
| 2013/0235719 A1 | 9/2013 | Ekici et al. |
| 2013/0337769 A1 | 12/2013 | Bhatia et al. |
| 2014/0022900 A1 | 1/2014 | Salot et al. |
| 2015/0117204 A1 | 4/2015 | Lott et al. |
| 2015/0117406 A1* | 4/2015 | Kim .................. H04W 36/0022 370/331 |
| 2016/0044531 A1 | 2/2016 | Papa et al. |
| 2016/0248916 A1 | 8/2016 | Payne, III et al. |
| 2016/0330279 A1 | 11/2016 | Patel et al. |
| 2016/0330655 A1* | 11/2016 | Vashi ................ H04W 36/0022 |
| 2016/0337957 A1 | 11/2016 | Gonsalves et al. |
| 2016/0366619 A1* | 12/2016 | Yang ..................... H04W 36/30 |
| 2017/0158213 A1 | 6/2017 | Mathews et al. |
| 2017/0238129 A1* | 8/2017 | Maier ................... H04W 4/029 455/404.2 |
| 2017/0238278 A1 | 8/2017 | Yadav |
| 2017/0303181 A1* | 10/2017 | Gupta ................... H04W 76/16 |
| 2018/0176209 A1* | 6/2018 | Narayanan .......... H04L 63/0823 |
| 2018/0217613 A1* | 8/2018 | Jiang ..................... G01S 19/51 |
| 2018/0227882 A1* | 8/2018 | Freda .................. H04W 72/085 |
| 2019/0041227 A1 | 2/2019 | Shetty et al. |
| 2019/0124124 A1* | 4/2019 | Chong ................ H04W 36/385 |
| 2019/0138934 A1 | 5/2019 | Prakash et al. |
| 2019/0182789 A1* | 6/2019 | Kim ..................... H04W 76/14 |

* cited by examiner

CIRCUIT-SWITCHED DOMAIN RESPONSE TO PACKET-SWITCHED DOMAIN FAILURE

TECHNICAL FIELD

Aspects of the disclosure generally relate to providing a circuit-switched domain response based on a packet-switched domain failure.

BACKGROUND

When a data connection fails, user equipment may attempt to retry the connection. However, in many cases the connection may again fail for the same reason that the initial attempt failed. Yet, the service delivery network (SDN) and vehicle may go into retry, which may waste power or other resources.

SUMMARY

In one or more illustrative examples, a vehicle includes a telematics controller programmed to identify a location, responsive to failure of a data call originated by the vehicle to initiate packet-switched communications, and responsive to the location being within a geographic boundary of a predefined failure zone, send, to a service delivery network configured to provide services to the vehicle, a message specifying that circuit-switched communication but not packet-switched communication is available to the vehicle.

In one or more illustrative examples, a system includes a server, in communication with a wide-area network supporting circuit-switched and packet-switched communications, programmed to send a circuit-switched wake request over the wide-area network to a vehicle requesting the vehicle to initiate a packed-switched data connection over the wide-area network, receive, from the vehicle, over the wide-area network in response to the circuit-switched wake request, a circuit-switched wake response indicating that packet-switched communications are not available at a current location of the vehicle, and update stored data descriptive of failure zones to indicate that the current location of the vehicle is a network location supporting circuit-switched communication but not packet-switched communication over the wide-area network.

In one or more illustrative examples, a method includes receiving, over a wide-area network from a vehicle, in response to a failed initiation of a packed-switched data connection over the wide-area network, a message indicating that packet-switched communications are unavailable at a current location of the vehicle, and updating failure zones to indicate that the current location of the vehicle is a network location supporting circuit-switched communication but not packet-switched communication over the wide-area network.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

When a vehicle is in a low power mode, packet-switched data connections to a network are dropped. In this low power mode, short message service (SMS) is utilized by vehicle service delivery networks (SDNs) to wake up or poke the vehicle to reestablish the data connection (typically to connect via a packet-switched address such as Internet protocol (IP)). The SMS wake up is sent over the circuit-switched (CS) domain. Responsive to receipt of the SMS wake up message, the telematics control unit (TCU) of the vehicle establishes a data connection over the packet-switched (PS) domain. In most cases, if the SMS is received, the vehicle is able to connect to the SDN via the PS domain to establish a data connection. Once back in low power mode, the vehicle deactivates the data connection, dropping the communication over the PS domain. In many systems, the PDP context (e.g., the IP address) is deactivated and the TCU becomes unreachable via data communication.

In certain scenarios, however, the vehicle is able to receive SMS but unable to successfully set up a data connection. This may be a result of poor coverage, or failure to register in the PS domain (rejection or other failures). Other times the vehicle may attempt to establish a data connection to the SDN independently such as at IGNITION ON. There are a number of reasons that SMS may be successful while data calls fail or data cannot be established. When the TCU is in a low power mode it is typically only registered for CS domain services, IMS may be deregistered (if supported) and, as described above, the PDP context is deactivated. In addition, SMS is sent over channels and coding schemes at higher power levels and/or enhanced error correction (e.g., signaling versus data). The establishment of the data connection may fail for a number of reasons such as poor coverage (e.g., the vehicle cannot establish a radio connection, data calls keep dropping, etc.) or PS domain registration rejections. Thus, there may be many reasons that the PS domain may fail but the vehicle is in a coverage location whereby SMS may be sent and received successfully.

In scenarios such as outlined above, where SMS may be sent and received successfully but a data connection cannot be established or maintained, an SMS may be sent from the vehicle to indicate the failure reason or an indication result may be sent in the SMS receipt acknowledgement. Accordingly, if the PS domain registration is not accepted or fails, but SMS in the CS domain is working, the vehicle can proactively indicate to the SDN via an SMS that data is not possible.

The vehicle may also be at a location known to provide poor coverage and power can be saved by using SMS to reply that data connection is not possible, rather than the vehicle attempting to set up a data connection that will fail. By indicating to the SDN that the vehicle is not in a mode to respond via the PS domain, the SDN will not retry to request the vehicle to set up a data connection and similarly the vehicle will not attempt to do so. Moreover, by sending a PS status indication for situations in which the vehicle itself attempts to wake, the vehicle can inform the SDN of local network conditions (e.g., PS is unavailable, PS is now available, etc.). These responses and indications will enable the vehicle to save power and for the SDN to be informed of the vehicle's status. Once data can be successfully established and maintained, the vehicle may again connect to the SDN.

As a further enhancement, a list of nearby known locations where data communication can be established may be included in the SMS messaging between the vehicles and the SDN. The SDN and/or vehicle may use this location information to predict when a data connection can be reestablished successfully.

Figure 1:
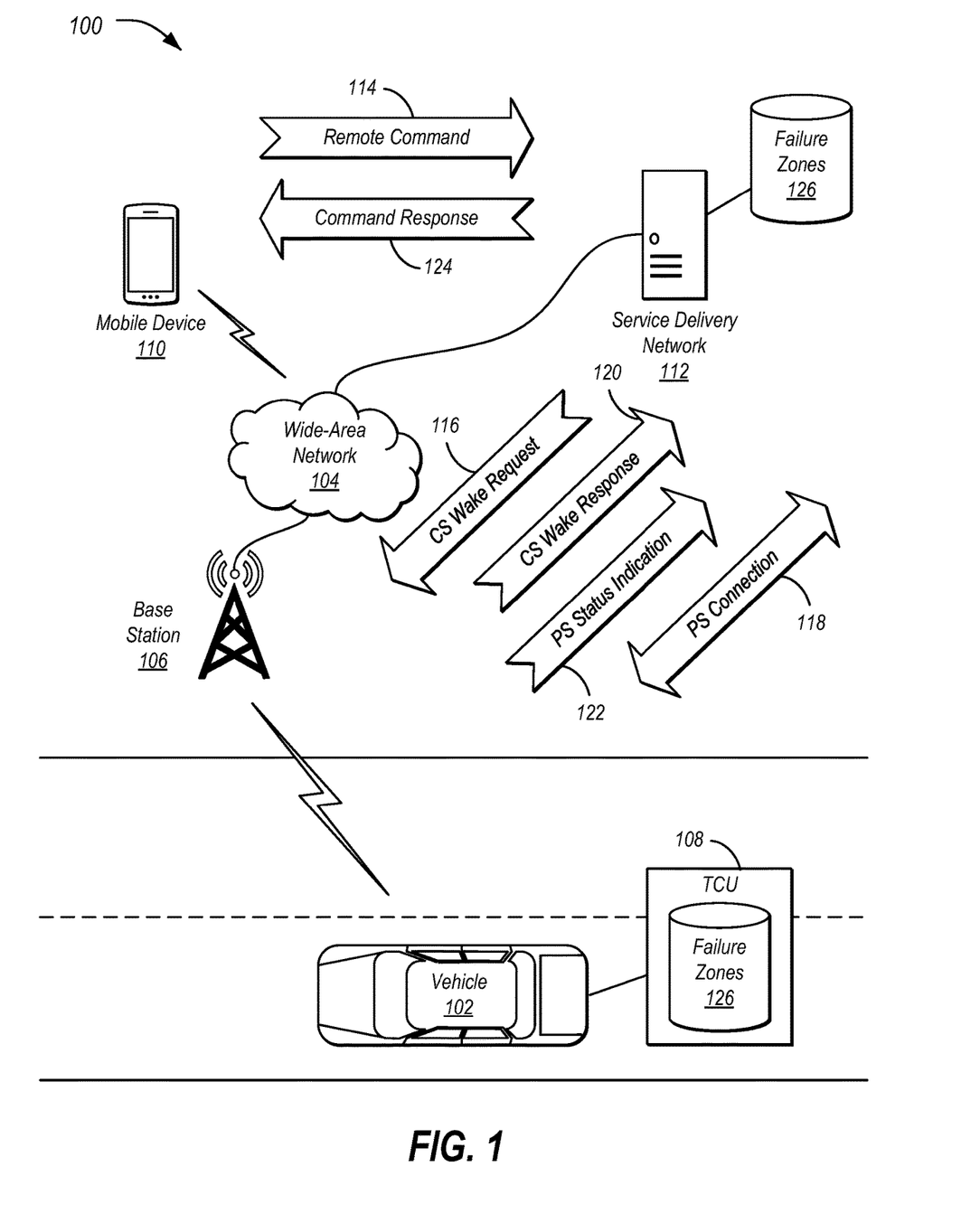
FIG. 1 illustrates an example system including a vehicle configured for providing circuit-switched domain responses to packet-switched domain failures.

FIG. 1 illustrates an example system 100 including a vehicle 102 configured for providing circuit-switched domain responses to packet-switched domain failures. As shown, the system 100 includes a vehicle 102 in communication with a service delivery network (SDN) 112 over a wide-area network 104. The vehicle 102 is configured to wirelessly communicate with base stations 106 connected to the wide-area network 104. Only one base station 106 is shown for clarity, but it should be noted that systems 100 typically include many base stations 106 arranged to cover a large geographical area. The vehicle 102 further includes a telematics control unit (TCU) 108 configured to send and receive data to networked devices connected to the wide-area network 104. The TCU 108 may identify failures to successfully establish data connections over the wide-area network 104 and may inform the SDN 112 of the failure over a circuit-switched connection. The TCU 108 and/or the SDN 112 may also maintain a listing of failure zones 126 that indicate areas in which data connections could not be reliably created. This failure zone 126 data may be shared between the TCU 108 and the SDN 112 to further inform data connection decisions. While an example system 100 is shown in FIG. 1, the example components as illustrated are not intended to be limiting. Indeed, the system 100 may have more or fewer components, and additional or alternative components and/or implementations may be used. As an example, the system 100 may include more or fewer vehicles 102 or base stations 106.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). The vehicle 102 may also be a battery electric vehicle (BEV) in some examples. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as VINs.

The wide-area network 104 may include one or more interconnected communication networks such as the Internet, a cable television distribution network, a satellite link network, a local area network, or a telephone network, as some non-limiting examples. By accessing the wide-area network 104, the vehicle 102 may be able to send outgoing communications from the vehicle 102 to network destinations on the wide-area network 104, and receive incoming communications to the vehicle 102 from network destinations on the wide-area network 104. It should be noted that the wide-area network 104 may support both CS communications as well as PS communications.

The base stations 106 may include system hardware configured to allow cellular transceivers of the vehicles 102 to access the communications services of the wide-area network 104. In an example, the base stations 106 may be part of a Global System for Mobile communication (GSM) cellular service provider. In another example, the base stations 106 may be part of a code division multiple access (CDMA) cellular service provider. The base stations 106 may support various different technologies and data speeds. For instance, the base stations 106 may support 3G, 4G LTE, and/or 5G communications technologies.

The telematics control unit (TCU) 108 is a vehicle 102 component configured to facilitate communication between various components of the vehicle 102 and the wide-area network 104. The TCU 108 may include one or more processors (not shown) (e.g., microprocessors) configured to execute firmware or software programs stored on one or more respective storage devices of the TCU 108. The TCU 108 may include a modem or other network hardware to facilitate the communication between the vehicle 102 and other devices connected to the wide-area network 104.

A mobile device 110 may be any of various types of portable computing device, such as cellular phones, tablet computers, smart watches, laptop computers, portable music players, or other devices capable of communication with the vehicle 102 over the wide-area network 104. The mobile device 110 may include one or more processors configured to execute computer instructions, and a storage medium on which the computer-executable instructions and/or data may be maintained.

The SDN 112 may include computing hardware configured to provide command and data services to the vehicles 102. These services may include, as some examples, remote locking and unlocking of vehicle doors, over-the-air software updating, and provisioning of traffic and navigation information.

A remote command 114 is a message sent from the mobile device 110 over the wide-area network 104 to the SDN 112 to request an action to be performed by a vehicle 102. As some examples, the remote command 114 may be a request for the vehicle 102 to unlock doors, lock doors, or remote start the engine.

A CS wake request 116 may be a SMS or other circuit-switched message sent to the vehicle 102 from the SDN 112. The CS wake request 116 may be sent responsive to receipt by the SDN 112 of the remote command 114. For instance, if the vehicle 102 is identified by the SDN 112 as being in low power mode (e.g., because a packet-switched connection over the wide-area network 104 between the vehicle 102 and the SDN 112 is not available), the SDN 112 may send the CS wake request 116 to the vehicle 102 that is the target of the remote command 114. Responsive to receipt of the CS wake request 116, the vehicle 102 may be configured to reestablish a packet-switched connection 118 with the SDN 112.

Responsive to a packet-switched connection 118 becoming available (or the packet-switched connection 118 already being available), the SDN 112 may send a vehicle request over the packet-switched connection 118 to the vehicle 102 requesting for the vehicle 102 to perform the operation specified by the remote command 114. The vehicle 102 may receive the vehicle request, and may send a vehicle response over the packet-switched connection 118 to the SDN 112 in response. The vehicle response may indicate a result of the command, such as whether doors were successfully unlocked or whether the vehicle 102 was successfully started. In turn, the SDN 112 may receive the vehicle response and send a command response 124 to the mobile device 110 indicative of the information included in the vehicle response.

However, in some cases the vehicle 102 may be unable to bring up the packet-switched connection 118. This may be a result of poor coverage, or failure to register in the PS domain (rejection or other failures). Other times the vehicle may attempt to establish a data connection to the SDN 112 independently such as at IGNITION ON (or when the vehicle 102 is otherwise in a motive mode such as an electric vehicle 102 in a ready to drive status). There are a number of reasons that circuit-switched messaging may be successful while packet-switched connections 118 cannot be established. When the TCU 108 is in a low power mode it is typically only registered for CS domain services, IMS is deregistered (if supported) and, as described above, the PDP context is deactivated. In addition, circuit-switched messaging is sent over channels and coding schemes at higher power levels and/or enhanced error correction (e.g., signaling versus data). The establishment of the data connection may fail for a number of reasons such as poor coverage (e.g., the vehicle cannot establish a radio connection, data calls keep dropping, etc.) or PS domain registration rejections. Thus, there may be many reasons that the PS domain may fail but the vehicle is in a coverage location whereby circuit-switched messaging may be sent and received successfully.

In scenarios such as outlined above, where circuit-switched messaging may be sent and received successfully but a packet-switched data connection 118 cannot be established or maintained, a CS wake response 120 may be sent as a circuit-switched message from the vehicle 102. In one example, the CS wake response 120 may be an SMS message sent from the vehicle 102 back to the SDN 112 responsive to receipt of the remote command 114. In another example, the CS wake response 120 may be an indication result sent in the circuit-switched receipt acknowledgement of the CS wake request 116. Regardless of which approach is used, if the PS domain registration is not accepted or fails, but circuit-switched messaging is working, the vehicle 102 can proactively indicate to the SDN 112 via circuit-switched messaging such as SMS that packet-switched data communication is not possible.

The CS wake response 120 may include various information. For instance, if the reason for the data connection failure is known, then that reason may be included in the CS wake response 120. The CS wake response 120 may also include additional contextual information, such as a fuel level of the vehicle 102 (e.g., battery charge, fuel tank level, etc.), whether the vehicle 102 drivetrain is idle, shutdown, or running, the current location of the vehicle 102 (e.g., as determined according to GNSS or another mechanism), and/or a time of the connection attempt for establishment of the packet-switched connection 118.

The vehicle 102 may also be at a location known to provide poor coverage. In such a case, power can be saved by using circuit-switched messaging to reply that a data connection is not possible, rather than the vehicle 102 attempting to set up a data connection that will fail. By indicating to the SDN 112 that the vehicle 102 is not in a mode to respond via the PS domain, the SDN 112 will not retry to request the vehicle 102 to set up a data connection, and similarly, the vehicle 102 will not attempt to do so. This enables the vehicle 102 to save power. The SDN 112 may be informed of the vehicle 102 status via the CS wake response 120. Once data can be successfully established and maintained, the vehicle 102 may again connect to the SDN 112.

In another scenario, the vehicle 102 may attempt to set up a PS connection without receiving a CS wake request 116 and may determine that PS communication is not possible. In such a situation, the vehicle 102 may send a PS status indication 122 to the SDN 112 to indicate to the SDN 112 that the vehicle 102 is in a location where establishing a PS connection is not possible. The PS status indication 122 may be similar to the CS wake response 120 in form and in included data, and may similarly serve to inform the SDN 112 of the vehicle status (e.g., PS is not available, PS has become available, etc.). However, the PS status indication 122 may be sent responsive to a vehicle 102 attempt to set up a connection, not responsive to a CS wake request 116.

As a further enhancement, a data store of failure zones 126, locations where data communication cannot be established, may be included in the circuit-switched messaging between the vehicle 102 and the SDN 112. Each failure zone 126 may indicate a geographic region in which the TCU 108 may have difficulty in communicating with the base stations 106. The failure zone 126 may also include an error code or other reason that is encountered by the TCU 108 when attempting to access the wide-area network 104 from within the geographic region of the failure zone 126. In an example, the geographic boundary of a failure zone 126 may be defined as a location point of a failure with a distance bound surrounding that point. The SDN 112 and/or the vehicle 102 may use this failure zone 126 information to predict when a data connection can be reestablished successfully.

In yet a further scenario, the vehicle 102 may predict entry to a known failure zone 126. In an example, the vehicle 102 may determine that based on the route being traveled by the vehicle 102 that the vehicle may enter a geographic region of a failure zone 126. Or, the vehicle 102 may determine that for the route the vehicle 102 may have previously connected to a cellular tower for which PS communication was unavailable. In these types of examples, the vehicle 102 may send a PS status indication 122 to the SDN 112 to indicate that the vehicle 102 may be entering a failure zone 126 and will be unable to establish a PS connection 118. As another possibility, the vehicle 102 may have an established PS connection 118 when determining potential entry to the known failure zone 126. In such a case, the vehicle 102 may send a PS status indication 122 over the PS connection 118 to indicate that the vehicle 102 is entering a no PS status.

In some cases, responsive to the vehicle 102 exiting the failure zone 126, the vehicle 102 may send a PS status indication 122 to indicate that the vehicle 102 is entering a PS is available status. Yet further, in cases where a failure zone 126 was the result of congestion that has now cleared, the vehicle 102 may send a PS status indication 122 to indicate that previous failure zone 126 is no longer a failure zone 126 and can be discarded.

Figure 2:
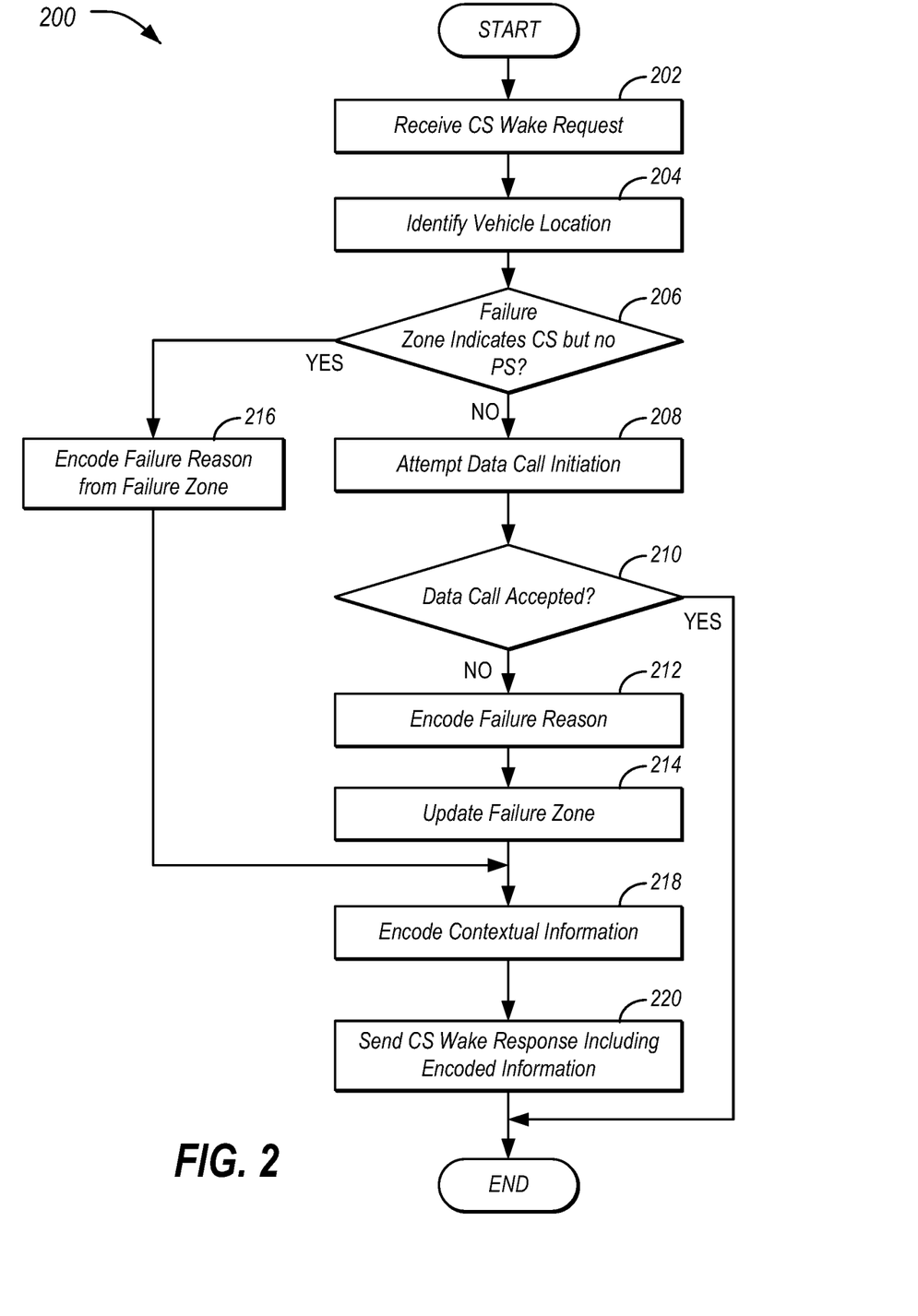
FIG. 2 illustrates an example process for vehicle response to circuit-switched wake requests.

FIG. 2 illustrates an example process 200 for vehicle 102 response to CS wake requests 116. In an example, the process 200 may be performed by the TCU 108 of the vehicle 102. However, it should be noted that similar processes 200 may be performed by other mobile devices beyond the in-vehicle context.

At operation 202, the TCU 108 receives a CS wake request 116. In an example, the CS wake request 116 may be received from the SDN 112. It should be noted that in other instances, rather than due to receipt of a CS wake request 116, the process 200 may be initiated responsive to a vehicle-triggered operation, such as a data call attempted in response to the vehicle 102 transitioning to a motive mode such as ignition on.

The TCU 108 identifies a location of the vehicle 102 at 204. In an example, the TCU 108 may retrieve a current location of the vehicle 102 using a GNSS controller of the vehicle 102.

At 206, the TCU 108 determines whether the failures zones 126 indicate that the vehicle 102 is located within a region in which CS but not PS communications over the wide-area network 104 are available. For instance, the TCU 108 may determine whether the location of the vehicle identified at operation 204 is within a distance D of a location point of a failure zone 126 defined as indicating that CS but not PS communications are possible. If the vehicle 102 is located in such a region, control passes to operation 216. Otherwise, control passes to operation 208.

At operation 208, the TCU 108 initiates a data call to establish a packet-switched connection 118. In an example, when starting the data call, the TCU 108 sends an ACTIVATE EPS BEARER CONTEXT REQUEST message over the wide-area network 104. This request can either be accepted by the wide-area network 104 or fail (e.g., be rejected or time out).

At 210, the TCU 108 identifies whether the data call was accepted. In the case of rejection, cause information is provided in a response message from the wide-area network 104 to indicate the reason for failure. If the data call was accepted, the process 200 ends. Otherwise, the process continues to operation 212.

At operation 212, the TCU 108 encodes the cause information into a failure reason to be provided in the CS wake response 120. For example, the TCU 108 may utilize a set of predefined values where each value indicates a particular error. Or, the TCU 108 may pass through error codes that are received from the wide-area network 104 in response to the data call indication attempt at operation 208.

At 214, the TCU 108 updates the failure zone 126 information. For instance, the TCU 108 may compute a probability of data failure for the location determined at operation 204. The failure probability of a failure zone 126 may be computed in various ways including, but not limited to: (i) the number of failed data calls vs. number of total data calls, or (ii) the number of consistently failed data calls (e.g., consecutive failures). The failure probability may be updated dynamically by the TCU 108 performing the data calls when it is in use. As long as the failure probability of a failure zone 126 exceeds a threshold F (e.g., a maximum number of failures that are allowed), the zone may be considered as an area that has low chance of success, and therefore should be added to the failure zone 126 list. As a specific example, a failure zone 126 may be marked as having a low likelihood of success for PS communications even if CS communications can be received.

It should be noted that the failure zones 126 may be uploaded from the vehicle 102 to the SDN 112 and may also be downloaded from the SDN 112. In this way, the vehicles 102 may be able to share information regarding failure zones 126. These upload or download operations may be performed during times where PS communications are possible over the packet-switched connection 118. Or in other cases, vehicles 102 may attempt to send the failure zone 126 information over CS communications when the vehicle 102 is in a location where CS communications are possible but not PS communications.

Proceeding from operation 206 in the case where the failure zone 126 indicates CS but no PS communications are available, control passes to operation 216 to encode the failure reason similar to as done at operation 214, but from the failure reason indicated by the failure zone 126, not from a data connection attempt. In doing so, the power and time necessary to attempt a data connection in a situation where PS networking is not available is avoided. After operation 214 or 216, control passes to operation 218.

Contextual information is encoded by the TCU 108 at operation 218. This information may include, as some examples, a battery charge level of the vehicle 102, whether the vehicle 102 drivetrain is idle, shutdown, or running, the current location of the vehicle 102 (e.g., as determined according to GNSS or another mechanism), and/or a time of the connection attempt for establishment of the packet-switched connection 118.

The TCU 108 sends the CS wake response 120 to the SDN 112 at operation 220. The CS wake response 120 may include whether the CS wake request 116 resulted in establishment of a packet-switched connection 118. The CS wake response 120 may also include the contextual information and failure reason information. After operation 220, the process 200 ends.

Figure 3:
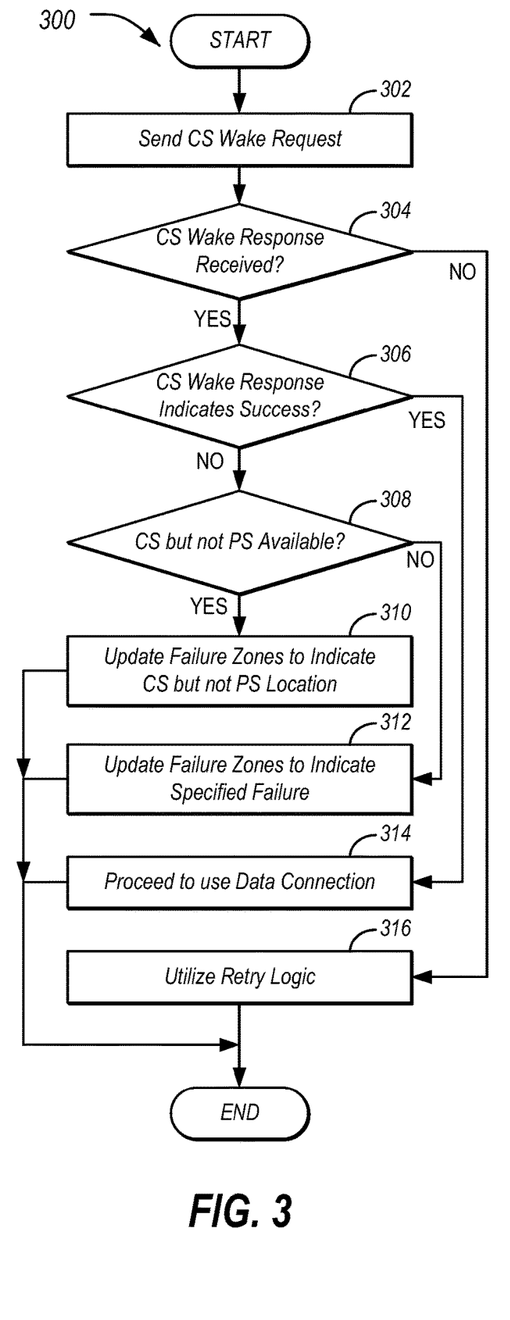
FIG. 3 illustrates an example process for sending of circuit-switched wake requests to vehicles from the service delivery network.

FIG. 3 illustrates an example process 300 for sending CS wake requests 116 to vehicles 102 from the SDN 112. In an example, the process 300 may be performed by the SDN 112 in attempted communication with vehicles 102 over the wide-area network 104.

At operation 302, the SDN 112 sends the CS wake request 116 to the vehicle 102. In an example, the CS wake request 116 may be sent responsive to a remote command 114 sent from the mobile device 110 requesting an action to be performed by the vehicle 102.

Figure 4:
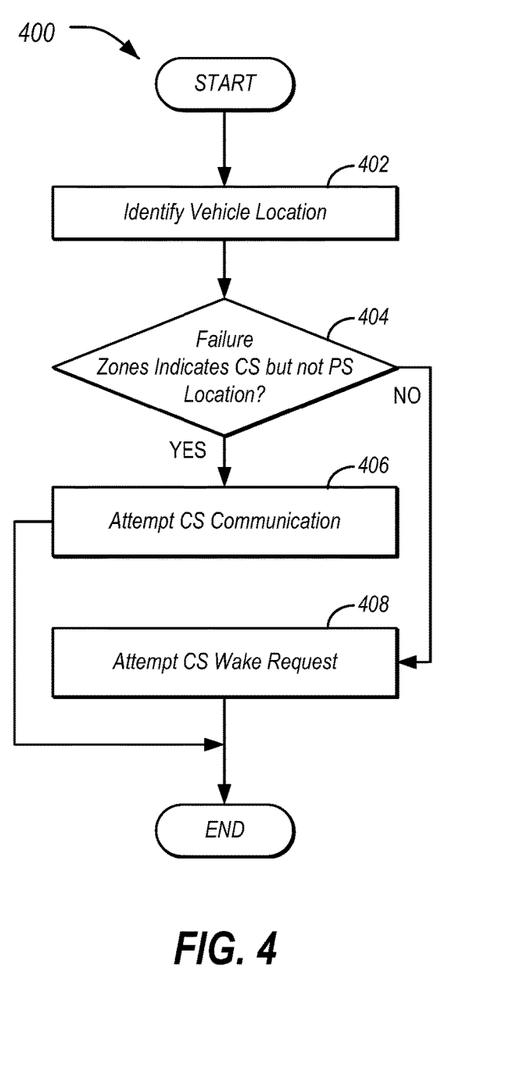
FIG. 4 illustrates an example process for utilizing retry logic by the service delivery network in view of a failed attempt to send the circuit-switched wake request.

At 304, the SDN 112 determines whether the CS wake response 120 was received. In an example, the CS wake response 120 may be received according to the process 200 discussed above. In other examples, if the vehicle 102 does not receive the CS wake request 116 or if the vehicle 102 receives the CS wake request 116 but does not or cannot respond, or the wide-area network 104 does not transmit the message back to the SDN 112, the SDN 112 does not receive the CS wake response 120. If the CS wake response 120 was received, control passes to operation 306. Otherwise control passes to operation 316 to utilize retry logic to attempt to resend the CS wake request 116. Further aspects of the retry logic are discussed with respect to the process 400. However, while not shown in the process 300, it should also be noted that a CS wake response 120 may not be needed if the PS connection 118 is already established. In such a case, if no CS wake response 120 was received but the PS connection 118 has been established, control passes instead to operation 314 to utilize the packet-switched connection 118 that was established.

At operation 306, the SDN 112 determines whether the CS wake response 120 indicates success. If so, control passes to operation 314 to utilize the packet-switched connection 118 that was established. After operation 314 the process 300 ends. If the CS wake response 120 does not indicate success, control passes to operation 308.

The SDN 112 determines whether CS but not PS communication is available at 308. This may be indicated, for example, by the error information included in the CS wake response 120. If so, control passes to operation 310 to update the failure zones 126 stored to the SDN 112 to indicate that CS but not PS communication is available for the location of the vehicle 102. Otherwise, control passes to operation 312 to update the failure zones 126 stored to the SDN 112 to indicate the specific other failure reason that was noted in the CS wake response 120. It should be noted that updating of the failure zones 126 may be performed by the SDN 112 similar to as described as being performed by the TCU 108 at operation 214 of the process 200. After operation 310 or 312, the process 300 ends.

FIG. 4 illustrates an example process 400 for utilizing retry logic by the SDN 112 in view of a failed attempt to send the CS wake request 116. In an example, the process 400 may be performed by the SDN 112 in attempted communication with vehicles 102 over the wide-area network 104.

The SDN 112 identifies the location of the vehicle 102 at operation 402. In an example, the SDN 112 may identify the location of the vehicle based on location information encoded into the CS wake response 120 received to the SDN 112. This may be a recently received CS wake response 120 that indicated failure of establishment of the packet-switched connection 118. In another example, the SDN 112 may identify the location of the vehicle 102 based on other prior messaging sent from the vehicle 102 useful for identifying the last-known vehicle 102 location.

At operation 404, the SDN 112 determines whether the failure zones 126 indicate that PS communication is available but not CS communication. This may occur, for example, responsive to attempting to utilize retry logic of the SDN 112 based on lack of receipt of a response from the vehicle 102, or responsive to receiving a response from the vehicle 102 and the SDN 112 considering whether to retry the attempt to have the vehicle 102 reconnect a packet-switched connection 118. If the failure zones 126 indicate that the vehicle 102 is at a location where PS communication is available but not CS communication, control passes to operation 406. Otherwise control passes to operation 408.

At 406, the SDN 112 attempts to perform communication over CS communications. For instance, the SDN 112 may send a CS message, e.g., an SMS to the vehicle 102 to attempt to perform the operations (or a subset of the operations) specified by a remote command 114. For some commands, this may allow for a minimal communication to take place, such as to poll a vehicle for state information to be received back via CS communications, to ensure that the vehicle 102 is locked responsive to a remote command 114 to ensure vehicle 102 is in a locked state. However, other commands may not be possible to be performed purely over CS communication due to bandwidth restrictions, so such commands may not be attempted or may fail based on a CS response denying the command returned from the vehicle 102

At operation 408, the SDN 112 attempts to perform an additional CS wake request 116. This may be done to attempt again to reestablish the packet-switched connection 118, in view of the vehicle 102 not having been identified as being in a region where PS communications are not possible. After operation 408, the process 400 ends.

Figure 5:
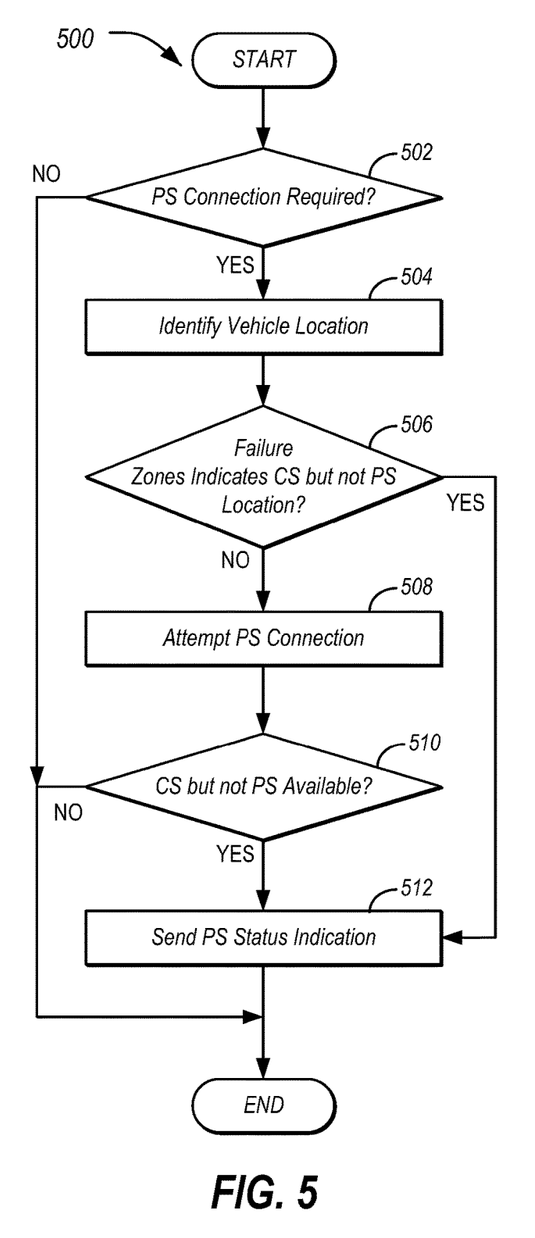
FIG. 5 illustrates an example process for sending no packet-switched indications from vehicles in cases where packet-switched connectivity is unavailable.

FIG. 5 illustrates an example process 500 for sending PS status indications 122 from vehicles 102 in cases where packet-switched connectivity is unavailable. In an example, the process 500 may be performed by the TCU 108 of the vehicle 102. However, it should be noted that similar processes 500 may be performed by other mobile devices beyond the in-vehicle context.

At 502, the TCU 108 determines whether a PS connection 118 is required. In an example, the TCU 108 may receive a request from a vehicle 102 component for data that requires a PS connection 118 over the network 104. Or, the vehicle 102 may have moved to a new location which may be outside of a failure zone 126, such that creation of a PS connection 118 may succeed or registration of the vehicle 102 with the network 104 may be successful.

The TCU 108 identifies a location of the vehicle 102 at 504. In an example, the TCU 108 may retrieve a current location of the vehicle 102 using a GNSS controller of the vehicle 102.

At 506, the TCU 108 determines whether the failure zones 126 indicate that PS communication is available but not CS communication. In an example, failure zones 126 may be maintained at the TCU 108 and the TCU 108 determine whether the location of the vehicle 102 determined at operation 504 is within a geographic boundary of one of the failure zones 126. If not, control proceeds to operation 508. If so, control passes to operation 512.

At operation 508, similar to as discussed at operation 208 of the process 200, the TCU 108 attempts to form a PS connection 118. The TCU 108 determines at 510 whether circuit-switched but not packet-switched networking is available. For instance, as discussed above, the TCU 108 identifies whether the data call was accepted. If the call was accepted, the process 500 ends. Otherwise, if the data call was rejected, at 512, the TCU 108 sends a PS status indication 122 to the SDN 112 to indicate to the SDN 112 that the vehicle 102 is in a location where establishing a PS connection is not possible. After operation 512 the process 500 ends.

Variations on the process 500 are contemplated. In an example, the vehicle 102 may attempt the PS connection 118 regardless of whether the vehicle 102 is currently in a failure zone 126 or make attempts at a reduced rate when in the failure zone 126. This may allow the vehicle 102 to determine that a failure zone 126 is no longer applicable (e.g., congestion at that point on the network 104 has cleared). If a failure zone 126 is no longer an issue, then the TCU 108 may send a PS status indication 122 to the SDN 112 to indicate to the SDN 112 that the failure zone 126 is no longer applicable. In further examples, the SDN 112 may disseminate information to the vehicles 102 to update the vehicles 102 regarding the current failure zones 126 (or removal of failure zones 126) in the vicinity of the vehicle 102.

Figure 6:
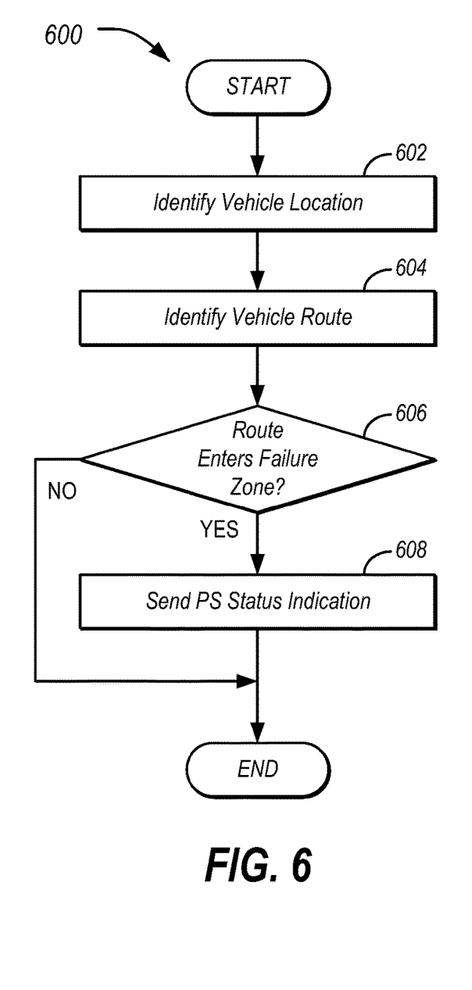
FIG. 6 illustrates an example process for sending no packet-switched indications from vehicles in anticipation of potential packet-switched connectivity issues.

FIG. 6 illustrates an example process 600 for sending PS status indications 122 from vehicles 102 in anticipation of potential connectivity issues. In an example, the process 600 may be performed by the TCU 108 of the vehicle 102. However, it should be noted that similar processes 600 may be performed by other mobile devices beyond the in-vehicle context.

At operation 602, the TCU 108 identifies a location of the vehicle 102 at 504. In an example, the TCU 108 may retrieve a current location of the vehicle 102 using a GNSS controller of the vehicle 102.

The TCU 108 identifies a route to be traversed by the vehicle 102 at 604. In an example, the TCU 108 may retrieve routing information from a navigation unit of the vehicle 102. In another example, the TCU 108 may receive speed and velocity information over a vehicle bus and may extrapolate the trajectory of the vehicle 102.

At 606, the TCU 108 determines whether the route enters a failure zone 126. In an example, the TCU 108 may determine whether an expected location of the vehicle 102 a predefined time into the future (e.g., one minute, thirty seconds, etc.) is within a geographic boundary of one of the failure zones 126. If not the process 600 ends. If so, control passes to operation 608 to send a PS status indication 122 in anticipation of the potential connectivity issue. After operation 608, the process 600 ends.

In general, computing systems and/or devices, such as the controllers of the vehicle 102, the TCU 108, the mobile device 110, and the SDN 112, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices such as the vehicle 102, the TCU 108, the mobile device 110, and the SDN 112, generally include computer-executable instructions that may be executable by one or more processors of the computing devices. Computer-executable instructions may be compiled or interpreted from computer programs created using a variety of programming languages and/or technologies, including, without limitation, and either alone or in combination, JAVA™, C, C++, VISUAL BASIC, JAVA SCRIPT, PERL, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. Some or all of the operations disclosed herein may be such computer program products. In some examples, these computer program products may be provided as software that when executed by one or more processors provides the operations described herein. Alternatively, the computer program products may be provided as hardware or firmware, or combinations of software, hardware, and/or firmware.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a telematics controller programmed to:
identify a location of the vehicle responsive to failure of a vehicle-originated data call to initiate packet-switched communications,
send, to a service delivery network configured to provide data services to the vehicle, a message specifying that circuit-switched communication but not packet-switched communication is available to the vehicle, and
create a failure zone responsive to a failure probability for data calls placed at locations within a geographic boundary of the failure zone exceeding a threshold maximum number of failures.

2. The vehicle of claim 1, wherein the data call is attempted responsive to receipt by the vehicle of a circuit-switched wake request, and the message is a circuit-switched wake response.

3. The vehicle of claim 2, wherein the circuit-switched wake response includes contextual information, the contextual information including one or more of: a fuel level of the vehicle, a status of a drivetrain of the vehicle, a current location of the vehicle, or a time of attempt for establishment of the data call.

4. The vehicle of claim 3, wherein the circuit-switched wake response includes the status of the drivetrain, and the status of the drivetrain includes whether an engine of the vehicle is running.

5. The vehicle of claim 1, wherein the data call is attempted responsive to a request by a vehicle controller to initiate the packet-switched communications, and the message is a status indication.

6. The vehicle of claim 1, wherein the message is sent to the service delivery network responsive to the location being within a geographic boundary of a predefined failure zone, and the geographic boundary is specified as a location point with a predefined distance bound surrounding the location point.

7. The vehicle of claim 1, wherein the telematics controller is further programmed to:
receive a circuit-switched wake request from a service delivery network;
attempt the data call responsive to receipt of the circuit-switched wake request; and
upload a list of failure zones including the created failure zone to the service delivery network.

8. The vehicle of claim 1, wherein the telematics controller is further programmed to download a list of failure zones from a service delivery network to obtain a list of crowd-sourced failure zones.

9. The vehicle of claim 1, wherein the telematics controller is further programmed to compute the failure probability as a number of failed data calls within the geographic boundary compared to a total number of attempted data calls for the geographic boundary.

10. The vehicle of claim 1, wherein the telematics controller is further programmed to compute the failure probability using a number of consecutive failed data calls within the geographic boundary.

11. The vehicle of claim 1, wherein the telematics controller is further programmed to recompute the failure probability responsive to the data call being rejected.

12. A system comprising:
a server, in communication with a wide-area network supporting circuit-switched and packet-switched communications, programmed to:
send a circuit-switched wake request over the wide-area network to a vehicle requesting the vehicle to initiate a packed-switched data connection over the wide-area network,
receive, from the vehicle, over the wide-area network in response to the circuit-switched wake request, a circuit-switched wake response indicating that packet-switched communications are not available at a current location of the vehicle,
receive, from the vehicle, an indication of a failure zone created by the vehicle responsive to a failure probability for data calls placed at locations within a geographic boundary of the failure zone exceeding a threshold maximum number of failures, and
update stored data descriptive of failure zones based on the indication to indicate that the current location of the vehicle is a network location supporting circuit-switched communication but not packet-switched communication over the wide-area network.

13. The system of claim 12, wherein the server is further programmed to refrain from sending future circuit-switched wake requests to vehicles located within a failure zone defined according to the current location of the vehicle.

14. The system of claim 12, wherein the server is further programmed to, responsive to determining from the failure zones that the current location of the vehicle is within network location supporting circuit-switched but not packet-switched communication over the wide-area network, attempt to communicate a command to the vehicle using circuit-switched communications.

15. The system of claim 12, wherein the circuit-switched communication includes short message service (SMS) messages.

16. The system of claim 12, wherein the server is further programmed to:
receive data indicative of failure zones from vehicles;
combine the data to update the stored data descriptive of failure zones maintained by the server; and
provide a list of the failure zones for download from the server to the vehicle.

17. The system of claim 12, wherein the server is further programmed to:
receive over the wide-area network from the vehicle, a status indication indicating that packet-switched communications are available at the current location of the vehicle; and
update the failure zones to indicate that vehicles located at the current location of the vehicle are at a network location supporting packet-switched communication over the wide-area network.

18. A method comprising:
receiving, by a server over a wide-area network from a vehicle, in response to a failed initiation of a packed-switched data connection over the wide-area network, a message indicating that packet-switched communications are unavailable at a current location of the vehicle,
receiving, by the server, an indication of a failure zone created by the vehicle responsive to a failure probability for data calls placed at locations within a geographic boundary of the failure zone exceeding a threshold maximum number of failures, and
updating, by the server, failure zones to indicate that the current location of the vehicle is a network location supporting circuit-switched communication but not packet-switched communication over the wide-area network.

19. The method of claim 18, further comprising:
refraining from sending, by the server, future circuit-switched wake requests to vehicles located within a failure zone defined according to the current location of the vehicle; and
responsive to determining by the server from the failure zones that the current location of the vehicle is within network location supporting circuit-switched but not packet-switched communication over the wide-area network, attempting by the server to communicate a command to the vehicle using circuit-switched communication.

20. A method comprising:
identifying, by a telematics controller of a vehicle, a location of the vehicle responsive to failure of a vehicle-originated data call to initiate packet-switched communications;
sending, from the vehicle to a service delivery network configured to provide data services to the vehicle, a message specifying that circuit-switched communication but not packet-switched communication is available to the vehicle; and
creating, by the vehicle, a failure zone responsive to a failure probability for data calls placed at locations within a geographic boundary of the failure zone exceeding a threshold maximum number of failures.

21. The method of claim 20, further comprising uploading, by the telematics controller, a list of failure zones including the created failure zone to the service delivery network.

* * * * *